(12) United States Patent
Gupta

(10) Patent No.: US 9,196,180 B2
(45) Date of Patent: Nov. 24, 2015

(54) IDENTIFICATION SYSTEM FOR A SURFACE

(75) Inventor: Sharvan Prakash Gupta, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1 day.

(21) Appl. No.: 14/119,232

(22) PCT Filed: May 24, 2012

(86) PCT No.: PCT/IB2012/052595
§ 371 (c)(1),
(2), (4) Date: Nov. 21, 2013

(87) PCT Pub. No.: WO2012/160531
PCT Pub. Date: Nov. 29, 2012

(65) Prior Publication Data
US 2014/0097963 A1    Apr. 10, 2014

(30) Foreign Application Priority Data

May 25, 2011    (EP) .................................... 11167457

(51) Int. Cl.
G08B 5/22      (2006.01)
G09F 19/22     (2006.01)
G09F 9/33      (2006.01)
H04N 5/272     (2006.01)
G02B 1/00      (2006.01)

(52) U.S. Cl.
CPC  G09F 19/22 (2013.01); G09F 9/33 (2013.01); H04N 5/2723 (2013.01); G02B 1/00 (2013.01)

(58) Field of Classification Search
CPC ........... G02B 1/00; G02B 6/0061; F21V 1/00
USPC ........ 340/815.45; 345/58, 589; 348/744, 136, 348/135
See application file for complete search history.

(56) References Cited

U.S. PATENT DOCUMENTS

2005/0104076 A1*  5/2005  Mueller-Mach et al. ....... 257/89
2007/0279494 A1   12/2007  Aman et al.
2009/0073313 A1   3/2009   Liu
2009/0097859 A1   4/2009   Tsai et al.

FOREIGN PATENT DOCUMENTS

| EP | 1362476 B1 | 2/2010 |
| JP | 2007163367 A | 6/2007 |
| JP | 2009027640 A | 2/2009 |
| TW | 200901002 A | 1/2009 |
| WO | 9702699 A1 | 1/1997 |
| WO | 2007054659 A2 | 5/2007 |
| WO | 2010049578 A1 | 5/2010 |
| WO | WO2010/049578 A1 * | 6/2010 |

* cited by examiner

*Primary Examiner* — Shirley Lu
(74) *Attorney, Agent, or Firm* — Meenakshy Chakravorty

(57) ABSTRACT

There is provided an identification system for identifying a predetermined surface for dynamic content control in a broadcast system. The system comprises at least one emitter element arranged to transmit an identification signal which is invisible with respect to the predetermined surface, and which comprises identification data regarding the outline of the predetermined surface.

13 Claims, 4 Drawing Sheets

IDENTIFICATION SYSTEM FOR A SURFACE

FIELD OF THE INVENTION

The present invention relates to the field of identification systems for surfaces, and more particularly to an identification system arranged for identifying a predetermined surface for dynamic control of content of the surface when transferring an image thereof, e.g. by means of TV-broadcasting.

BACKGROUND OF THE INVENTION

To display static and moving images to large crowds of people, both indoors and outdoors, a technology is available, which can provide screen sizes from up to 20 meters wide and beyond, with sufficient brightness to be used in bright sunshine. Typically, a well suited and widely used technology for these outdoor displays is based on utilizing light emitting diodes, LEDs, as the light-emitting devices. Such LED displays have been available for many years now and are the displays of choice currently installed in major sports and public venues around the world.

In recent times, a market has emerged for LED banner displays placed around a play court or a field of play at sports events that are used to display advertising targeted primarily at the large TV audience. The introduction of dynamic control of advertising using LED banner displays to replace traditional static billboards has significantly increased the advertising revenue generated within sports.

However, several controlling bodies (e.g. UEFA) remain sceptical about the performance of the LED banner displays that are available today citing the pixelisation of images as a major flaw when a camera zooms in close-up to the LED banner display. The image resolution is in such circumstances judged to be far inferior to the traditional static billboard signs. Accordingly they prefer higher resolution LED banner displays to be used at their events but the far higher purchase price of suitable displays cannot be justified and is not financially viable as it generates no additional revenue. It is for this latter market segment that the present inventive concept is particularly relevant, although it may be applied to any display. A LED banner display is typically used to inform and entertain the viewing public with a view to drawing their attention to the advertising content as a means of generating additional advertising revenue. For the attending public at the event, the LED banner display is sufficiently far away as to show a good quality image with no visible pixelisation to the naked eye. However, the true value of a LED banner display is only fully realized when the event is broadcast to a much larger viewing audience. Typically the camera will only be focused on a particular message for a short period of time, so the viewing audience must quickly be able to recognize the brand and the message contained in the advertisement for it to be fully effective. When the camera is zoomed in, the impact and the meaning of the displayed message may be lost, or become unclear, due to several potential weaknesses in the LED banner display, for example; pixelisation due to the relatively large pixel pitch; poor color reproduction if the color point is not set correctly; insufficient resolution to reproduce small details or text; poor contrast levels making the message unreadable, especially with direct sunlight on the display surface; too little or too high brightness level for the surroundings.

Furthermore, the actual message may be meaningless to the viewing audience at a particular location because it is actually targeted at another (local) viewing audience. The advertised product may not be available to the viewing audience at that location for many reasons.

The net benefit of the present inventive concept is that the same physical LED display banner area may be utilized to show different content in different localities that is meaningful to the audience in that locality. The locally targeted content may be from a different, locally recognized (international) brand, from the same international brand, but with a different but locally recognized, (similar) product, from the same international brand and the same product but with a different (local) message, for example, in the local language, from the same international brand but a different product.

In summary, there is a large commercial interest in techniques for substituting parts of an image of a sports scene with different advertisements directed to different audiences, as the advertising revenue per event can be significantly increased through targeted advertising.

Patent specification EP 1 362 476 B1 discloses identifying a surface of an object for dynamic content control by arranging a marking surface on the object or in its vicinity, which marking surface is identifiable on the basis of radiation differing from its environment on the basis of a property other than the color of visible light.

SUMMARY OF THE INVENTION

It is an object of the present inventive concept to provide an alternative manner of identifying a surface for dynamic control of external content, like e.g. targeted advertisements in a broadcast image of a scene comprising the display, in a simple and robust manner. It should be emphasized that the present inventive concept is applicable to any suitable surface, not just a display, but further to surfaces of e.g. a wall, vehicle, or clothing etc. The external content may be any type of information. Further, any suitable broadcast medium may be used for transmitting the image of the scene.

The inventive concept is based on providing an identification system in or at the surface itself, which allows the surface to, in communication with a detector or camera system for broadcasting of a scene containing the surface, identify itself, and to provide information regarding its outlines and location. Thereby, the broadcasted image of the scene containing the surface can be processed to include other content mapped into suitable parts of the image as identified by the surface.

This and other objects are achieved by providing a system having the features defined in the independent claims. Preferred embodiments are defined in the dependent claims.

According to a first aspect of the inventive concept there is provided an identification system for identifying a predetermined surface. The system comprises at least one emitter element arranged to transmit an identification signal which is invisible with respect to the predetermined surface. The identification signal is arranged to comprise identification data regarding the outline of the predetermined surface. Thereby, a surface can in a convenient manner be detected and identified with respect to e.g. its outer contour. This can advantageously be used for displaying information in the predetermined surface on another location. By implementing the identification system to be associated with e.g. a plain wall, it is possible to adjust a camera towards that wall, identify the predetermined surface by detecting the identification signal from the emitter element, and to via image processing add external content, like information, images or advertisements, to the identified surface in the image which is broadcasted to remote viewers. At the real location no information is visible on the wall. The use of an emitter element is advantageous as the predetermined surface is actively identifying itself. Further, the use of an emitter element for identifying the predetermined surface is advantageous for use with mobile systems, e.g. when a display provided with the identification system is used in different places, and thereby under different conditions. The use of one or more emitter elements allows a flexible system as it may be reconfigured to be adapted to new conditions, e.g. by changing the power of emission etc. For mobile systems in particular where the ambient conditions are different and unknown, the use of an emitter element confers advantages to passive surfaces. Active emitter systems can be easily and quickly configured to adapt to the prevailing ambient conditions to ensure correct and reliable identification of the selected surface(s), whereas a passive system often requires complicated and accurate set-up of critical parameters to function and may fail to work if the ambient conditions suddenly or unexpectedly change, e.g. if the sun shines strongly during an event that start under dark, cloudy conditions. Further emitter element based system can be designed to be very robust to lessen the risk of failure. The use of emitter elements is also advantageous as they may be optimized with respect to a detector. The at least one emitter element may be a light emitting diode, LED.

According to an embodiment of the identification system, the one or more emitter element is arranged at the predetermined surface, which is advantageous.

According to an embodiment of the identification system, the identification signal is based on an operating wavelength outside the range of visible light, which is advantageous as the emitted identification signal does not interfere with e.g. the visible image received by either camera or the viewing public at an event. Further, when comprising a plurality of emitter elements, the emitter elements may be arranged such that at least a group of the emitter elements are positioned along the borders of the predetermined surface or of a sub-area thereof such that an invisible image identifying the predetermined surface area is emitted.

According to an embodiment of the identification system, the identification signal is modulated, pulsed or polarized, which is advantageous for decreasing problems caused by interference from the surrounding environment. This in turn minimizes the likelihood of false detection and errors in a receiver arranged to receive and analyze the identification signal.

According to an embodiment of the identification system comprising a plurality of emitter elements, the emitter elements are distributed over the predetermined surface with a predetermined density.

According to an embodiment of the identification system, the predetermined density is selected for, when receiving the identification signal, providing a resolution being sufficient for identifying an outline of a foreign object in front of the predetermined surface. A foreign object may be a player or officials or any object e.g. ball/puck, racket, stick, bat on the playing field impeding direct viewing of a predetermined surface being for instance a display area.

According to an embodiment of the identification system, when comprising at least two emitter elements, wherein the emitter elements are arranged to transmit the identification code at two different wavelengths. Advantageously, upon identifying the surface two frequencies are monitored to retrieve the identification signal, and one of the wavelengths can then be used as a background reference level for the second wavelength to improve the contrast of the retrieved identification signal. This is advantageous as it can reduce detection errors as well as reducing the emitted signal power required for detection.

According to an embodiment of the identification system, the identification data comprises data associated with the predetermined surface and/or at least one sub portion of the predetermined surface arranged within the limits thereof, regarding at least one of: boundaries, identification code, position, location, and size.

According to an embodiment of the identification system, the system further comprises a conduit arranged to collect and transmit the identification signal across at least a portion of said predetermined surface. This may be achieved by means of a light guide or conducting material that collects the emitted signal, and can advantageously be used e.g. to outline the borders of the predetermined surface or of a sub-area thereof, while using only one or a limited number of emitting elements.

According to an embodiment of the identification system, the predetermined surface is a display area of a display. Thus, the at least one emitter element is arranged to transmit an identification signal which is invisible with respect to an image provided by the display area, the identification signal comprising identification data regarding the outline of the display. Thereby an identification system is provided which identifies the outline of the display in a convenient manner. When the system is arranged in or at the display itself, a reduced upfront investment in the display system for broadcasting e.g. a sports event at a venue is achieved, while extra revenue due to the possibility of targeted advertisement may be generated. Local advertisements or other information is displayed to the event audience, while regional or country specific advertisements or information is broadcasted to remote viewers.

The identification system is advantageously applicable for use in e.g. LED banner (also named fascia or ribbon) displays which are placed around a play court. In a LED banner display, the light emitting elements constituting the display area of the display are light emitting diodes, LEDs. Herein, LEDs may in general refer to conventional semiconductor light-emitting diodes, to organic LEDs (OLEDs), or polymer light-emitting diodes (PLEDs). In general displays comprising any light emitting elements/sources/materials like for instance lamps, lasers, plasma, LCD and phosphors are applicable for the present inventive concept.

According to an embodiment of the identification system, the emitter element is optically matched to light emitting elements constituting the display area, such that the emitted identification signal is emitted within the viewing cone of the display. That is, for instance if the display is a typical LED display, the LEDs used have a lens to bundle and direct the light towards the viewing public (or the camera). The viewing cone is defined as the intensity profile in both the horizontal and the vertical directions, which viewing cone define the viewing area for the display at a particular intensity relative to the peak intensity (e.g. 50% of the peak intensity). It is advantageous for the invisible emitter to mimic this intensity profile so that the fall-off in intensity of the invisible signal at any particular viewing location mimics the fall-off in intensity of the visible picture on the display at the same location relative to the reference viewing location (viewing angle).

According to an embodiment of the identification system, at least one emitter element is one of, or a group of, a plurality of light emitting elements constituting the display area, or is contained within one of, or within a group of, a plurality of light emitting element containing packages constituting the display area.

According to a further aspect of the inventive concept, there is provided a display comprising an identification system according to the present inventive concept.

It is noted that the present inventive concept relates to all possible combinations of features recited in the claims.

BRIEF DESCRIPTION OF THE DRAWINGS

This and other aspects of the present inventive concept will now be described in more detail, with reference to the appended drawings showing embodiment(s) of the present inventive concept.

DETAILED DESCRIPTION

Although the present inventive concept is hereinafter described with reference to a broadcasting system in which LED banner displays are identified for dynamic content control, other types of surfaces like walls, surfaces on vehicles being for instance advertisement areas on cars in motor racing, clothes like for instance advertisements on player shirts, jackets, shorts or helmets in various sports etc. are also applicable for the present inventive concept.

Figure 1:
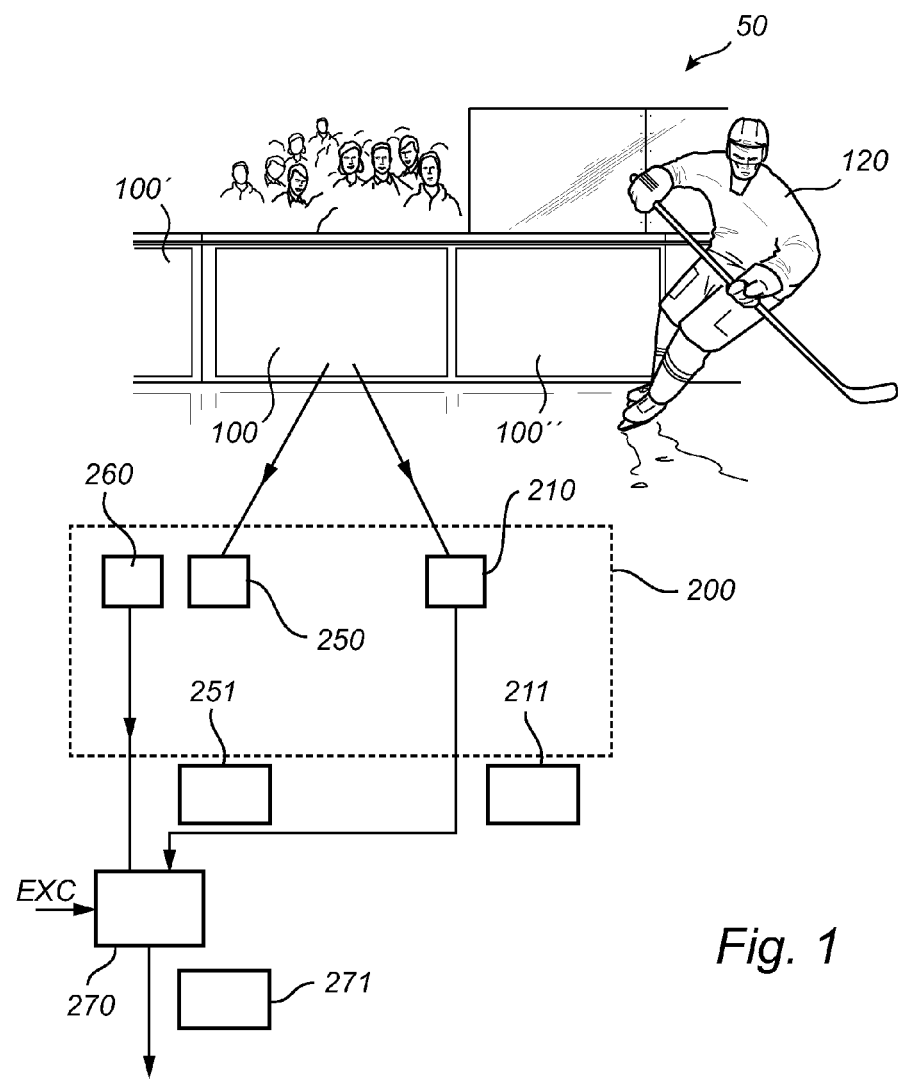
FIG. 1 is a schematic block diagram illustrating an exemplifying broadcasting system comprising an embodiment of an identification system according to the present inventive concept.

An exemplifying broadcasting system which utilizes an identification system according to the present inventive concept is schematically illustrated in a block diagram in FIG. 1. In a scene 50 of a sports event, three LED banner displays, 100', 100, and 100", placed around a rink at a play court are visible. The LED banner displays will for simplicity herein under be referred to as the displays. It should further be mentioned that any type of applicable display may be utilized and are considered to fall within the scope of the invention. The displays, 100', 100, and 100", are used to display advertising targeted at the attending audience, but are in addition used to display advertising targeted at a large TV audience by means of dynamic control of the advertising in the broadcasted image 271 of the scene 50. Each display 100 comprises an identification system according to the present inventive concept. The display 100 comprises at least one emitter element (not visible here), which is arranged to transmit an identification signal, ID, which is invisible with respect to the visible image which is locally shown on the display area, i.e. typically an advertisement.

A camera 210 is arranged to film the scene 50, and thereby to retrieve an image SI of the scene. Simultaneously, the identification signal ID from the displays present in the scene 50 is detected by a detector 250. The detector is here integrated in a camera unit 200 comprising the camera 210 (optional). The identification signal ID of a display comprises identification data regarding the outline of that display. By processing this identification data in a processing means 260, a mapping 251 of available display areas in an image the scene is obtained. Subsequently, the camera image 211 is image processed in an image processor 270, and based on the mapping 251, external content EXC is mapped into the broadcasted image 271. The external content EXC may be targeted advertisements, or other information which is to be integrated in the image of the scene, and to replace the locally shown image on the display area. This image processing to add the external content EXC may be performed at the sports event, prior to transmission of the broadcast, or e.g. at a broadcast station. In general the location for the image processing of the signal to be received, processed and retransmitted may take place anywhere depending on the data transmission system used. The distribution of the signal may be done by means of broadcasting as described above, but any data transmission or distribution means like e.g. cable, Internet, Wireless telephony (3G) is applicable.

Figure 2:
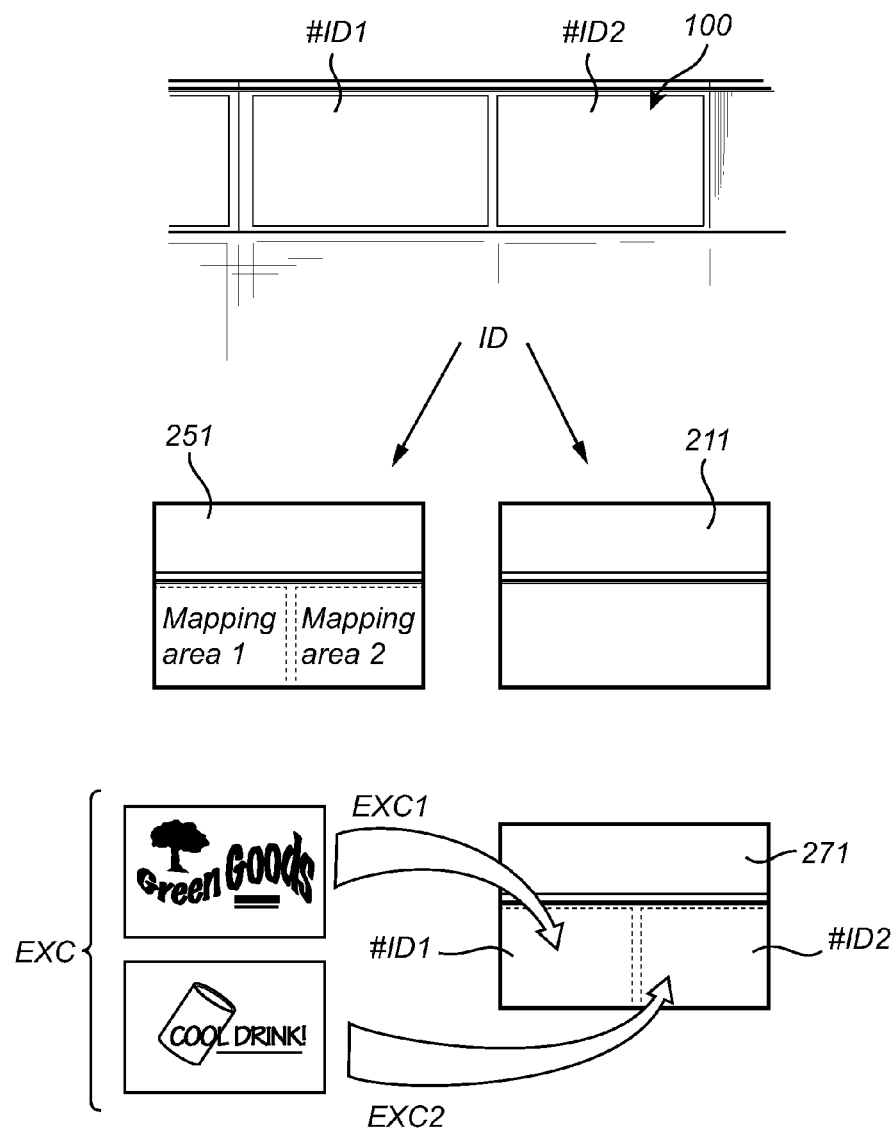
FIG. 2 illustrates an exemplifying image processing sequence in the broadcasting system of FIG. 1, FIG. 3a-c are schematic front views of displays comprising embodiments of the identification system according to the present inventive concept.

FIG. 2 illustrates an exemplifying image processing sequence in the broadcasting system illustrated in FIG. 1. The display 100 here contains two display modules, which are sub portions of the available active display area of the display. The display modules are in FIG. 2 denoted as #ID1 and #ID2. Thus, the identification data ID from the display 100 comprises data associated with the display 100 and with the respective display module, #ID1 and #ID2, regarding the boundaries, a respective identification codes, position, location, and size of each respective display area which is available for dynamic control of its broadcasted image contents. Thus, imagine as an illustration a case when the whole active display area of display 100 shows one single color, even if the camera image 211 of the scene 50 retrieved by the camera 210 only shows a scene containing a one colored display 100, the mapping 251 of the same scene 50 will identify the outline of the display 100, and the two display modules, #ID1 and #ID2. Thus, when overlapping the mapping 251 and the camera image 211, the positioning of external content EXC to be placed in the selected areas of the broadcasted image 271, here the display modules, #ID1 and #ID2, can be achieved. An advertisement for Green Goods, EXC1, is mapped into the display module (or area) #ID1, and vice versa an advertisement for Cool Drink is mapped into the display module #ID2. In an alternative embodiment the mapped content may span multiple display modules.

Figure 3A:
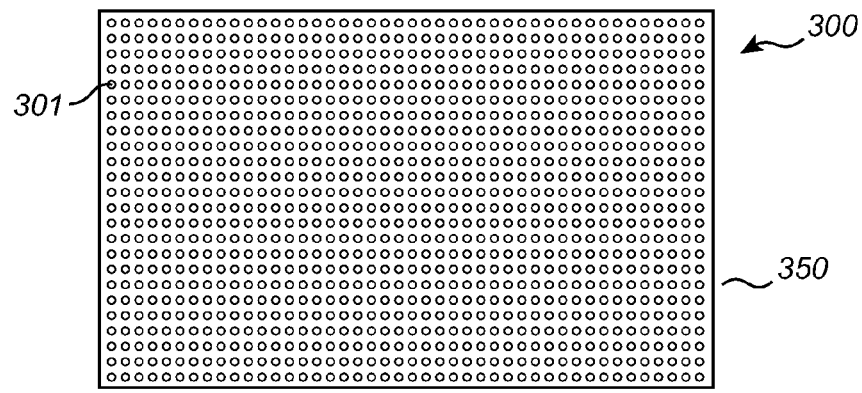
Figure 3B:
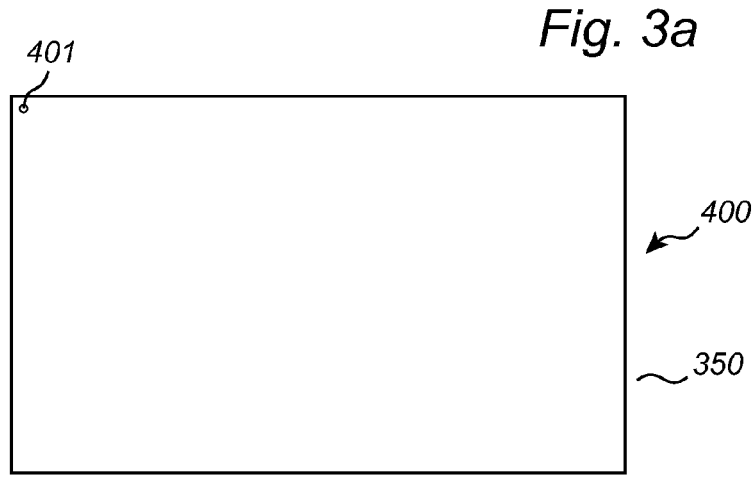
Figure 3C:
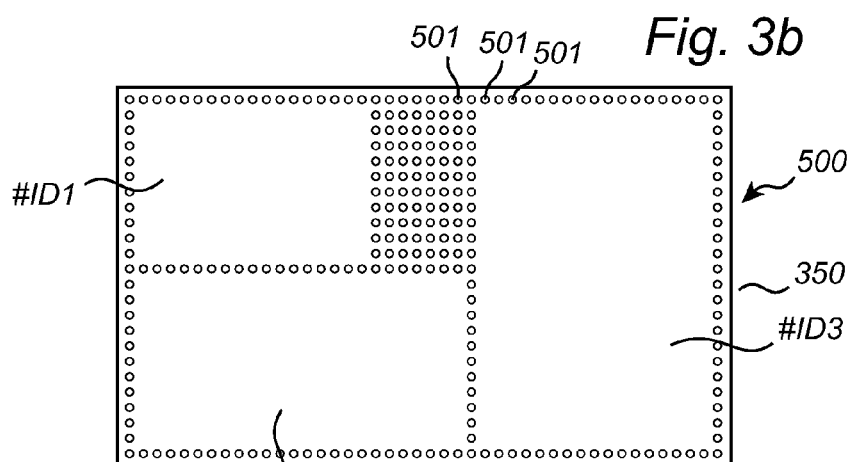

FIGS. 3a-c illustrate different displays comprising embodiments of an identifications system according to the present inventive concept. The display 300 in FIG. 3a is a LED banner display in which the display area 350 for providing a visible color image is constituted by traditional RGB-LED-matrix, e.g. the light emitting elements constituting the display area 350 are red, green and blue LEDs. The display 300 is here rectangularly shaped, and has the outer dimensions of 0.96 m×0.8 m. However, any size and shape of the display or surface to be identified is applicable for the present inventive concept. A number of evenly distributed emitter elements 301 are provided on the display area 350, e.g. with a pixel spacing of 20 mm. The emitter elements may be provided as discrete components or be contained within one of, or within a group of, light emitting element containing packages constituting the display area 350.

As one example of many suitable emitter elements, the emitter elements 301 are here infrared light emitting diodes, e.g. infrared LED, emitting light with a wavelength of 875 nm, and having a beam angle of 110° (horizontal) and 40 degrees (vertical). Thus, the identification signal ID sent by the emitter elements 301 is based on an operating wavelength outside the range of visible light.

Accurate masking is one of the key features enabled by the present inventive concept. As previously explained, with reference to FIG. 1, the identification signal ID of the display is received by a detector capable of recognizing the invisible identification signal. Here, the identification signal is emitted by a plurality of emitting elements 301, and thus forms an invisible image of the display 300. In the present display 300, the density of the emitter elements 301 is selected for providing a resolution which is sufficient for a detector system to identify the location, size and position of the display 300. Further, by selecting a high density of the emitter elements, not only the outline of the display 300, but in addition the outline of a foreign object in front of the display area 350 is possible to detect (see FIG. 1 in which a player 120 blocks the view of the display 100). The detector and processing means are preferably arranged such that if there are any obstructions between the camera and the display, the detector is able to recognize the outlines of the obstructions. The mapping of display areas available for dynamic control of external contents (251 in FIGS. 1 and 2) is thereby masked such that no external content is mapped into and thereby displayed in an image of the scene within the area covered by the obstruction.

According to an embodiment of the identification system as described above, the density of the emitter elements 301 is selected to be equal to the density of the visible LEDs constituting the display area 350 of the display 300.

Determining the outline of the display and of any obstacles as described above is very important for masking. Further, to correctly map any new external content onto the display to dynamically control, and thereby replace the current contents in a selected display area, the unique identification of each display and display module (see #ID1, #ID2 etc. in FIGS. 1 and 2) is essential. Each position of the displays and display modules that are currently in view of the camera has to be correctly located. This also helps to ensure consistency when the camera moves or pans or if the live feed is switched to another camera position and is referred to as tracking. To enable correct tracking, each display and display module is uniquely identified. There are several methods available to enable tracking:

each display module is arranged to show a unique ID resulting from a combination of characters, numbers, or another pattern that can be mapped to the whole display area, a unique, non-repeating pattern is defined that covers the whole display area, and a signal is pulsed or modulated to move across the display surface, such that the timing of the signal determines the location on the display. This solution requires accurate synchronization between the detector and the emitter elements.

According to embodiments of the identification system, to differentiate the emitted radiation of the emitter elements from the surroundings, one or a combination of the following techniques can be applied:

the wavelength of the emitted radiation is selected to lie outside of the wavelength range of the background radiation (e.g. the visible image displayed by the display area), or with a wavelength at which the background radiation levels are at a minimum, the intensity of the emitted radiation is selected to exceed the levels of the background radiation, the emitted radiation is modulated or pulsed, the emitted radiation is polarized, and the emitter elements are arranged in a predetermined pattern.

Note that the emitter elements may emit visible light, while the selected technique itself provides the invisible identification signal. For instance, the one or more emitter elements may be one of, or a group of, light emitting elements constituting the display area. That is, one or more light emitting element emitting visible light are emitter elements. By for instance modulating these emitter elements with a recognizable pulse pattern (which is not visible to the naked eye or the broadcasting system), or by arranging these emitter elements to only transmit polarized light, the detector and processing means can be arranged to distinguish the emitter elements from their surroundings.

FIG. 3b illustrates a display 400 with a display area 350 and a single emitter element 401. In this configuration one, or a combination of, the different techniques as described above are applicable for differentiating the emitted radiation from the emitter element 401 from the surrounding. The single emitter element 401 may be selected to emit light of an invisible or visible wavelength, which is further modulated or pulsed to contain identification data ID regarding the display. A coded message is thus transmitted via the emitter element 401, and subsequently received by a detector unit for decoding of the message.

In FIG. 3c an illustration of a display 500 comprising an identification system in which the emitter elements 501 are distributed on the display area to create a pattern is shown. The emitter elements 501 are arranged to form an outer frame to show the outline of the display area 350, and further to form sub frames identifying different display modules, #ID1, #ID2, and ID3#.

According to an embodiment of the identification system, the emitter elements used are selected to be optically matched to the light emitting elements constituting the display area, such that the emitted identification signal is emitted within the viewing cone of the display. As an example, in a typical LED banner display, the LEDs constituting the display area have a 3D viewing cone defined by the 50% viewing angles of e.g. 110 degrees (horizontal) and 60 degrees (vertical). The intensity profile of the LEDs is angle dependent both horizontally and vertically from the normal. By arranging the viewing cone of emitter element to mimic that of the visible display, the emitter signal has the same intensity profile as the visible picture so the fall-off in intensity of the visible picture is similar to that of the invisible emitter at the same viewing angle.

Figure 4A:
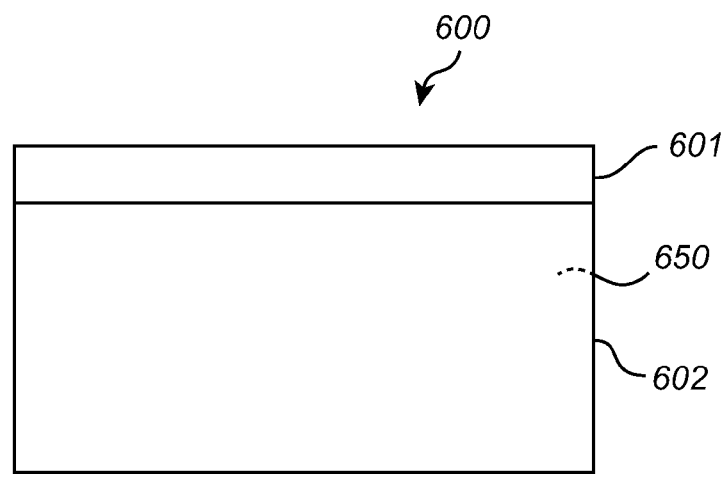
FIG. 4a is a schematic front view, and 4b is a schematic cross-sectional side view, illustrating a display comprising an embodiment of an identification system according to the present inventive concept.
Figure 4B:
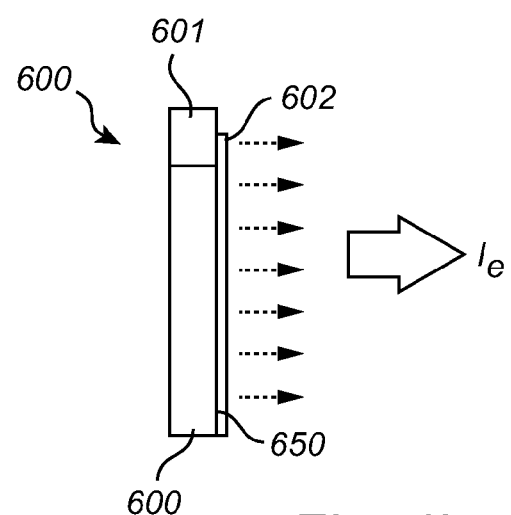

In an embodiment of the identification system as described with reference to FIG. 4, a display 600 is provided with an emitter (or an array of emitter elements) 601 which is optically coupled to a conduit 602 arranged to collect and transmit the identification signal across the surface of the display area 650 of the display 600. The conduit 602 is here a transparent light guide layer provided over the display area 650. The conduit 602 is made of an IR-conducting material, e.g. a plastic (compound) material which is optimized to conduct and emit the emitter signal, and which is further transparent to visible light such that the visible image of the display area 650 is transmitted through the conduit 602, while the emitted radiation from the emitter element(s) 601 is guided over the display area 650 under that at least part of the emitted light exiting the conduit 602 in a forward direction, i.e. in the same direction as the visible image of the display area 650.

According to an embodiment of the identification system, there is provided at least two emitter elements (or optionally at least two groups of emitter elements) in a display. Further, the emitter elements (or respective group) are arranged to transmit the identification code at two different (invisible) wavelengths. This enables one wavelength to be used as a background reference level for the second wavelength to improve the contrast. This can reduce detection errors as well as reducing the emitted signal power required for detection.

The emitter elements in the identification systems as described in the present application are typically controlled by a control unit (not shown). For an identification system which utilizes a plurality of emitter elements, which are arranged in a geometrical manner so as to outline the display, the control unit may in principle be a power unit, which may optionally be integrated in the display electronics. For more complicated identification, which is based on e.g. modulating the emitter elements, the control unit may include processing means and memory means.

The person skilled in the art realizes that the present concept by no means is limited to the preferred embodiments described above. On the contrary, many modifications and variations are possible within the scope of the appended claims.

The invention claimed is:

1. An identification system for identifying a predetermined surface, said system comprising at least one emitter element arranged to transmit an identification signal which is invisible with respect to said predetermined surface and comprising identification data regarding the outline of said predetermined surface, wherein said predetermined surface comprises a unique ID comprising a non-repeating pattern configured to be mapped to said predetermined surface.

2. An identification system according to claim 1, wherein said emitter element is arranged at said predetermined surface.

3. An identification system according to claim 1, wherein said identification signal is based on an operating wavelength outside the range of visible light.

4. An identification system according to claim 3, wherein said identification signal is modulated, pulsed or polarized.

5. An identification system according to claim 4 comprising a plurality of emitter elements, wherein said emitter elements are distributed over said predetermined surface with a predetermined density.

6. An identification system according to claim 5, wherein said predetermined density is selected for, when receiving said identification signal, providing a resolution being sufficient for identifying an outline of a foreign object in front of said predetermined surface.

7. An identification system according to claim 6, wherein said at least one emitter element is a light emitting diode, LED.

8. An identification system according to claim 7, when comprising at least two emitter elements, wherein said emitter elements are arranged to transmit said identification signal at two different wavelengths.

9. An identification system according to claim 8, wherein said identification data comprises data associated with said predetermined surface and/or at least one sub portion of said predetermined surface arranged within the limits thereof, regarding at least one of: boundaries, identification code, position, location, and size.

10. An identification system according to claim 9, further comprising a conduit arranged to collect and transmit said identification signal across at least a portion of said predetermined surface.

11. An identification system according to claim 10, wherein said predetermined surface is a display area of a display.

12. An identification system according to claim 11, wherein said emitter element is optically matched to light emitting elements constituting said display area, such that said emitted identification signal is emitted within the viewing cone of the display.

13. An identification system according to claim 11, wherein said at least one emitter element is one of, or a group of, a plurality of light emitting elements constituting said display area, or is contained within one of, or within a group of, a plurality of light emitting element containing packages constituting said display area.

* * * * *